US012592165B2

(12) United States Patent
Seol et al.

(10) Patent No.: US 12,592,165 B2
(45) Date of Patent: Mar. 31, 2026

(54) MANUFACTURING METHOD OF BRONCHOSCOPY SIMULATOR

(71) Applicants: PUSAN NATIONAL UNIVERSITY INDUSTRY-UNIVERSITY COOPERATION FOUNDATION, Busan (KR); PUSAN NATIONAL UNIVERSITY HOSPITAL, Busan (KR)

(72) Inventors: Hee Yun Seol, Yangsan-si (KR); Seo rin Kim, Yangsan-si (KR); Seok Young Ahn, Busan (KR); Hwan Yi Joo, Busan (KR); Joon Ho Moon, Busan (KR); Jae Young Kim, Busan (KR); Moon Chae Kim, Busan (KR)

(73) Assignees: PUSAN NATIONAL UNIVERSITY INDUSTRY-UNIVERSITY COOPERATION FOUNDATION, Busan (KR); PUSAN NATIONAL UNIVERSITY HOSPITAL, Busan (KR)

( * ) Notice: Subject to any disclaimer, the term of this patent is extended or adjusted under 35 U.S.C. 154(b) by 209 days.

(21) Appl. No.: 18/410,609

(22) Filed: Jan. 11, 2024

(65) Prior Publication Data

US 2025/0046214 A1 Feb. 6, 2025

(30) Foreign Application Priority Data

Aug. 3, 2023 (KR) ........................ 10-2023-0101399

(51) Int. Cl.
*G09B 23/28* (2006.01)

(52) U.S. Cl.
CPC .................................. *G09B 23/285* (2013.01)

(58) Field of Classification Search
CPC ...... G09B 23/285; G09B 23/30; B29C 41/14; B29C 41/08; B29C 41/36; B29C 41/38
See application file for complete search history.

(56) References Cited

U.S. PATENT DOCUMENTS

| | | | | |
|---|---|---|---|---|
| 10,350,833 | B1 * | 7/2019 | Zaneveld | ............... B29C 64/386 |
| 2010/0047752 | A1 * | 2/2010 | Chan | ..................... B29C 39/021 |
| | | | | 264/250 |
| 2016/0332388 | A1 * | 11/2016 | Park | ..................... B29C 64/188 |

(Continued)

FOREIGN PATENT DOCUMENTS

| | | |
|---|---|---|
| KR | 10-2018-0124005 A | 11/2018 |
| KR | 10-2227735 B1 | 3/2021 |
| KR | 10-2022-0099206 A | 7/2022 |

OTHER PUBLICATIONS

Korean Office Action for related KR Application No. 10-2023-0101399 mailed Jul. 25, 2025 from Korean Intellectual Property Office.

*Primary Examiner* — James S. McClellan
(74) *Attorney, Agent, or Firm* — Paratus Law Group, PLLC

(57) ABSTRACT

A manufacturing method of a bronchoscopy simulator, includes: a base part printing step in which a base part is printed by a 3D printer; a plastic dipping step in which plastic dipping is applied to the outside of the base part; a through-hole forming step in which a through-hole is formed in the base part; and a liquid passing step in which liquid passes through the through-hole to melt away only the base part while leaving the plastic dipping intact.

4 Claims, 10 Drawing Sheets

(56)        References Cited

U.S. PATENT DOCUMENTS

| | | | | |
|---|---|---|---|---|
| 2017/0291359 | A1* | 10/2017 | Kerins | ............... B29C 37/0025 |
| 2019/0122584 | A1* | 4/2019 | McAlpine | ............. C09D 11/30 |
| 2019/0337235 | A1* | 11/2019 | Moosberg | ............. B33Y 30/00 |
| 2024/0000381 | A1* | 1/2024 | Andino | ............... A61B 5/6804 |
| 2024/0363028 | A1* | 10/2024 | Roe | ........................ G09B 23/34 |
| 2025/0101564 | A1* | 3/2025 | Chandra | ............... B33Y 10/00 |

* cited by examiner

Joint forming step(S50)

Bronchial cutting step — S51

Frame insertion step — S52

Joint insertion step — S53

First adhesive applying step — S54

Bronchial connection step — S55

Second adhesive applying step — S56

Liquid injection step — S57

MANUFACTURING METHOD OF BRONCHOSCOPY SIMULATOR

CROSS-REFERENCE TO PRIOR APPLICATION

This application claims priority to Korean Patent Application No. 10-2023-0101399 (filed on Aug. 3, 2023), which is hereby incorporated by reference in its entirety.

BACKGROUND

The present disclosure relates to a manufacturing method of a bronchoscopy simulator, and more specifically, to a manufacturing method of a bronchoscopy simulator with a movement function according to respiratory motions.

In general, a bronchoscopy simulator is provided as a model for mastering how to use a bronchoscope. The bronchoscope is inserted into the oral cavity, passes through the vocal cords, and reaches inside the bronchus to observe the surroundings.

Such a bronchoscope simulator is conventionally manufactured in a manner of dividing into several parts and connecting the parts with joints. Each of the parts has been manufactured using silicone molding.

However, in the case in which a bronchoscope simulator is manufactured through the conventional method, since the bronchi are rigid differently from the real bronchi, the bronchoscope simulator may cause a sense of dissimilarity compared with a case when a bronchoscope is used to the real bronchi, and cause damage to the bronchoscope during use.

Furthermore, since the conventional bronchoscope simulator is designed to divide the bronchi into sections and assemble the divided bronchi, there is a difference between the shape of the conventional bronchoscope simulator and the shape of the actual bronchi of a patient.

For instance, Patent Document 1 discloses a "3D modeling method of organs and 3D organ model", and an objective of Patent Document 1 is to provide a 3D organ model with a clear distinction between normal tissues and lesions.

The 3D modeling method and the 3D organ model of organs have an advantage of reduced manufacturing time and cost. However, Patent Document 1 merely represents a method of creating organs through 3D modeling, but cannot manufacture the bronchi to have the characteristics of the bronchi of an actual patient that a portion of the bronchi stretches and moves according to the movement of the bronchoscope simulator, similarly to the actual bronchoscopy.

Related Art: Korean Patent No. 10-2227735

SUMMARY

Accordingly, the present disclosure has been made to solve the above-mentioned problems occurring in the prior arts, and it is an objective of the present disclosure to provide a manufacturing method of a bronchoscopy simulator with a movement function according to respiratory motion, thereby providing a user with procedure experiences similar to the reality, compared to the conventional bronchoscopy simulator.

The objectives of the present disclosure are not limited to those mentioned above, and other objectives not mentioned herein will be clearly understood by those skilled in the art from the following description.

To accomplish the above object, according to the present disclosure, there is provided a manufacturing method of a bronchoscopy simulator including: a base part printing step in which a base part is printed by a 3D printer; a plastic dipping step in which plastic dipping is applied to the outside of the base part; a through-hole forming step in which a through-hole is formed in the base part; a liquid passing step in which liquid passes through the through-hole to melt away only the base part while leaving the plastic dipping intact; and a joint forming step in which a joint is formed on one side of the base part.

Moreover, the base part printing step includes: a support part removal step in which a support part generated while the base part is printed by the 3D printer is removed.

Furthermore, the plastic dipping step includes: a first spraying step in which a dipping spray is firstly sprayed to the outside of the base part; a first liquid applying step in which a dipping liquid is firstly applied to the outside of the base part; a second liquid application step in which the dipping liquid is secondly applied to the outside of the base part in a state in which a gauze is attached to the outside of the base part; a third liquid applying step in which the dipping liquid is thirdly applied to the outside of the base part; and a second spraying step in which the dipping spray is secondly applied to the outside of the base part.

Additionally, in the plastic dipping step, the dipping spray and the dipping liquid are formed from a rubber material to enhance the elasticity and stretchability of the plastic dipping.

In addition, in the plastic dipping step, the base part is printed by a 3D a water-soluble polyvinyl alcohol (PVA) material, and in the liquid passing step, water passes through the through-hole.

As described above, according to the present disclosure, the manufacturing method of the bronchoscopy simulator forms a bronchoscopy simulator made of an elastic material and can realize movement according to respiratory motions, thereby providing a user with experiences similar to the reality in performing a bronchoscopy procedure.

Furthermore, the manufacturing method of the bronchoscopy simulator according to the present invention forms the bronchoscopy simulator of a material similar to the material of the real bronchi, thereby providing the user with a sufficient practice environment to promote safety of a patient.

The advantages of the present disclosure are not limited to the above-mentioned advantages, and other advantages, which are not specifically mentioned herein, will be clearly understood by those skilled in the art from the following description.

DETAILED DESCRIPTION

Terms will be used in this specification will be described in brief, and the present disclosure will be described in detail.

The terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Therefore, the terms used herein have to be defined based on the meaning of the terms together with the description throughout the specification.

Also, when a part "includes" or "comprises" a component, unless there is a particular description contrary thereto, the part can further include other components, not excluding the other components.

Hereinafter, with reference to accompanying drawings, the embodiments of the present disclosure will be described in detail so that the embodiments may be easily realized by those skilled in the art. However, the present disclosure may be implemented in various ways without being limited to the embodiments.

Specific matters including the objectives of the present disclosure, means for achieving the objectives, and the effect of the invention are included in the following embodiments and drawings. Advantages and features of the present disclosure, and method to achieve them of the present disclosure will be obvious with reference to embodiments along with the accompanying drawings which are described below.

Figure 1:
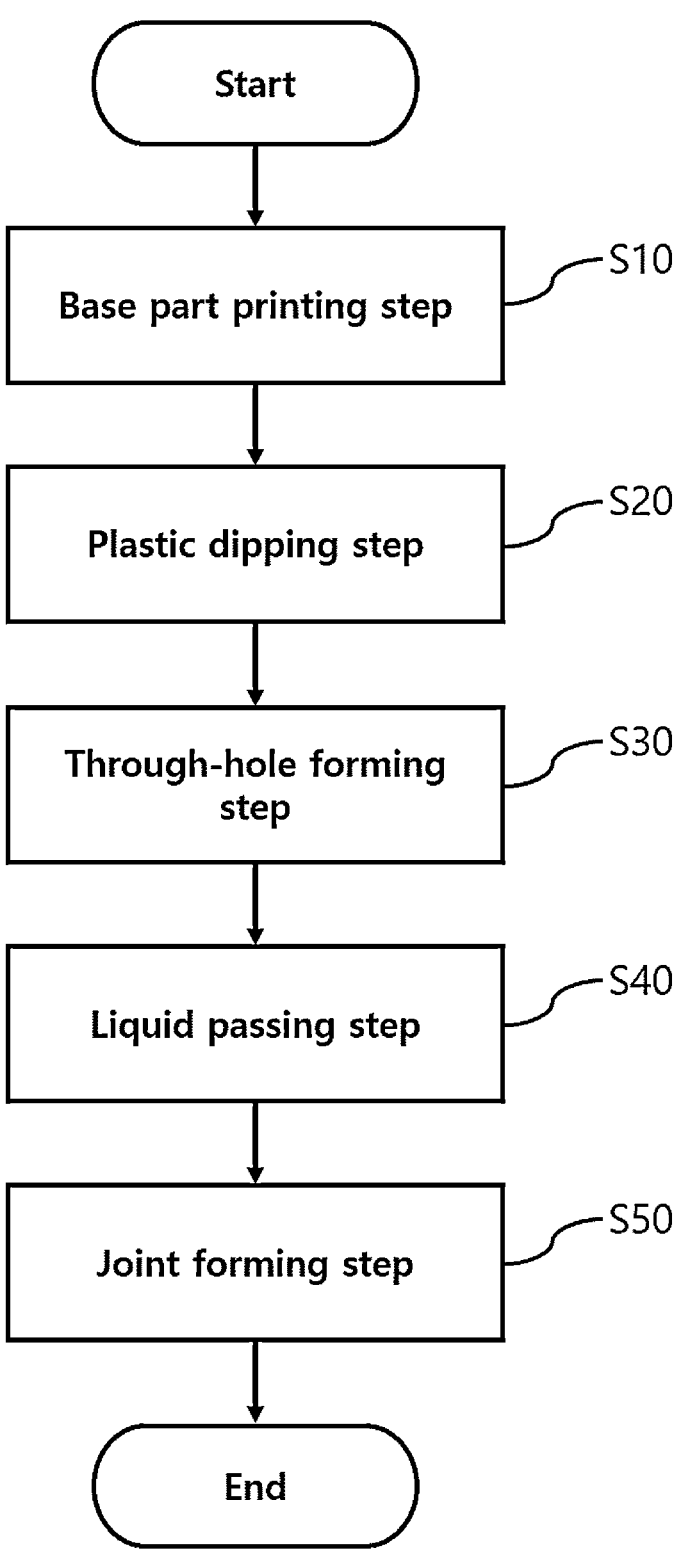
FIG. 1 is a block diagram illustrating a manufacturing method of a bronchoscope simulator according to the present invention.
Figure 2:
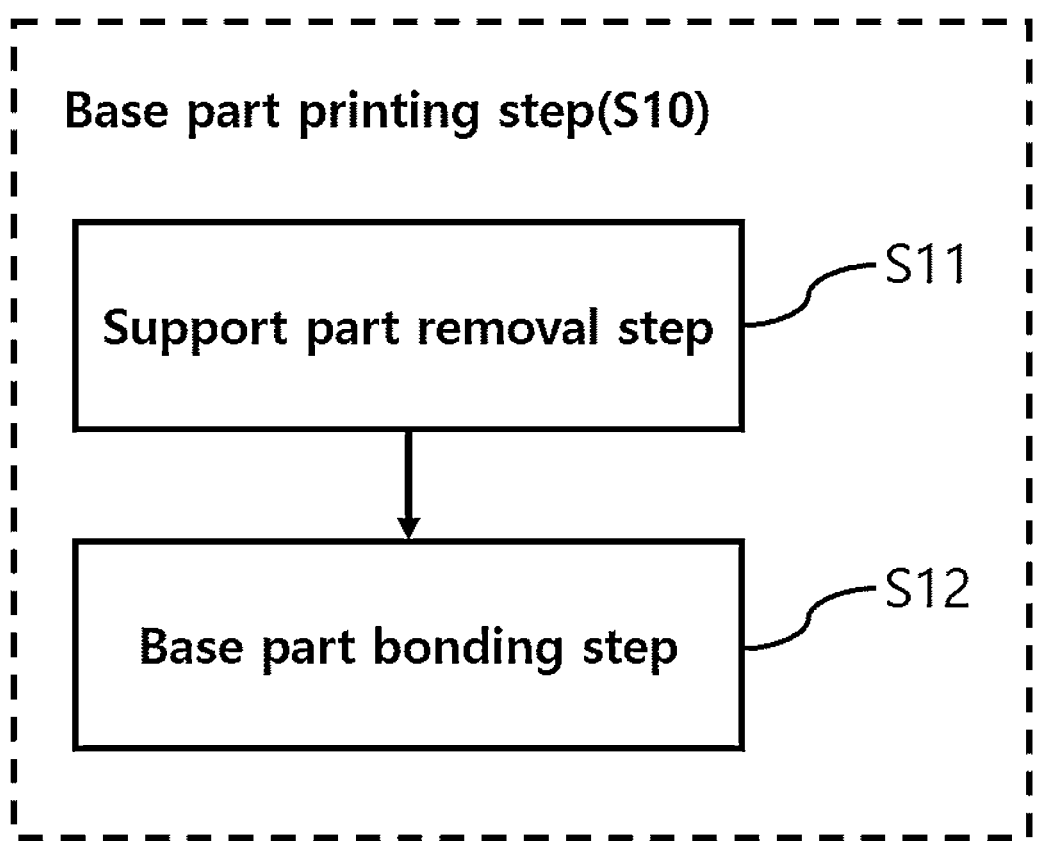
FIG. 2 is a block diagram sequentially illustrating a base step the manufacturing method of the part printing of bronchoscope simulator according to the present invention.
Figure 3:
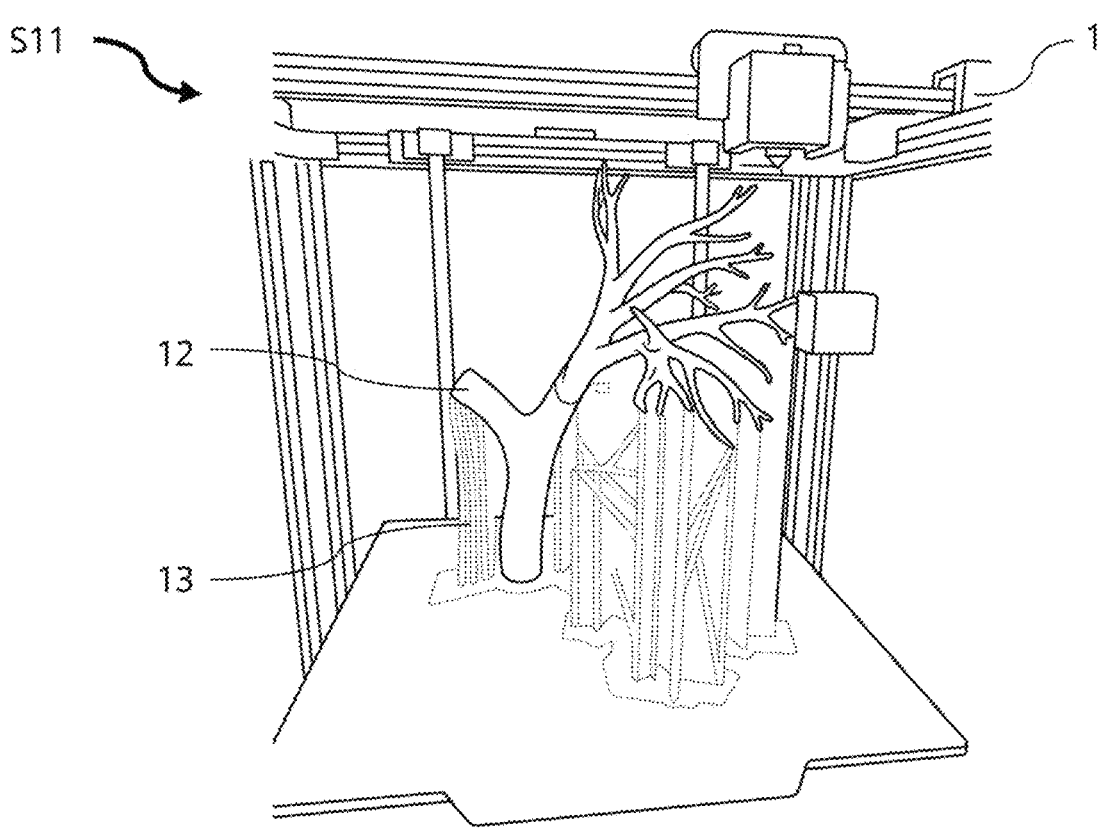
FIG. 3 is a view illustrating a support part removal step of the manufacturing method of the bronchoscope simulator according to the present invention.
Figure 4:
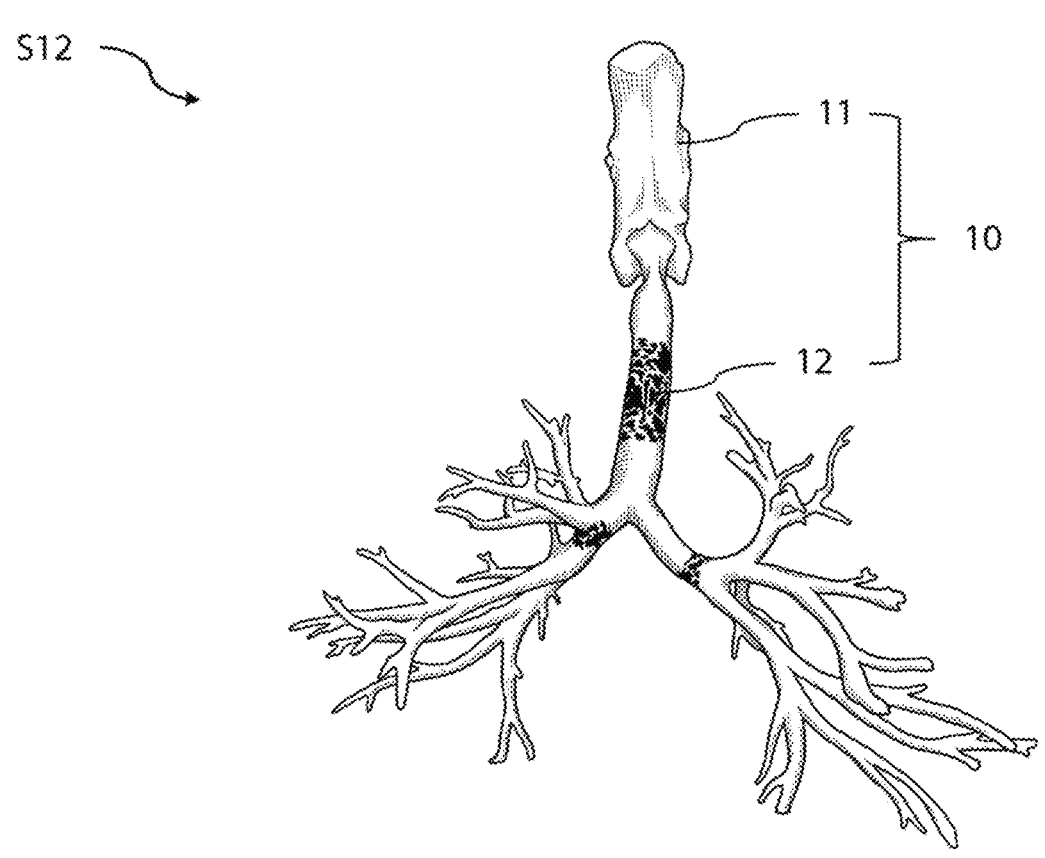
FIG. 4 is a view illustrating a base part bonding step of the manufacturing method of the bronchoscope simulator according to the present invention.
Figure 5:
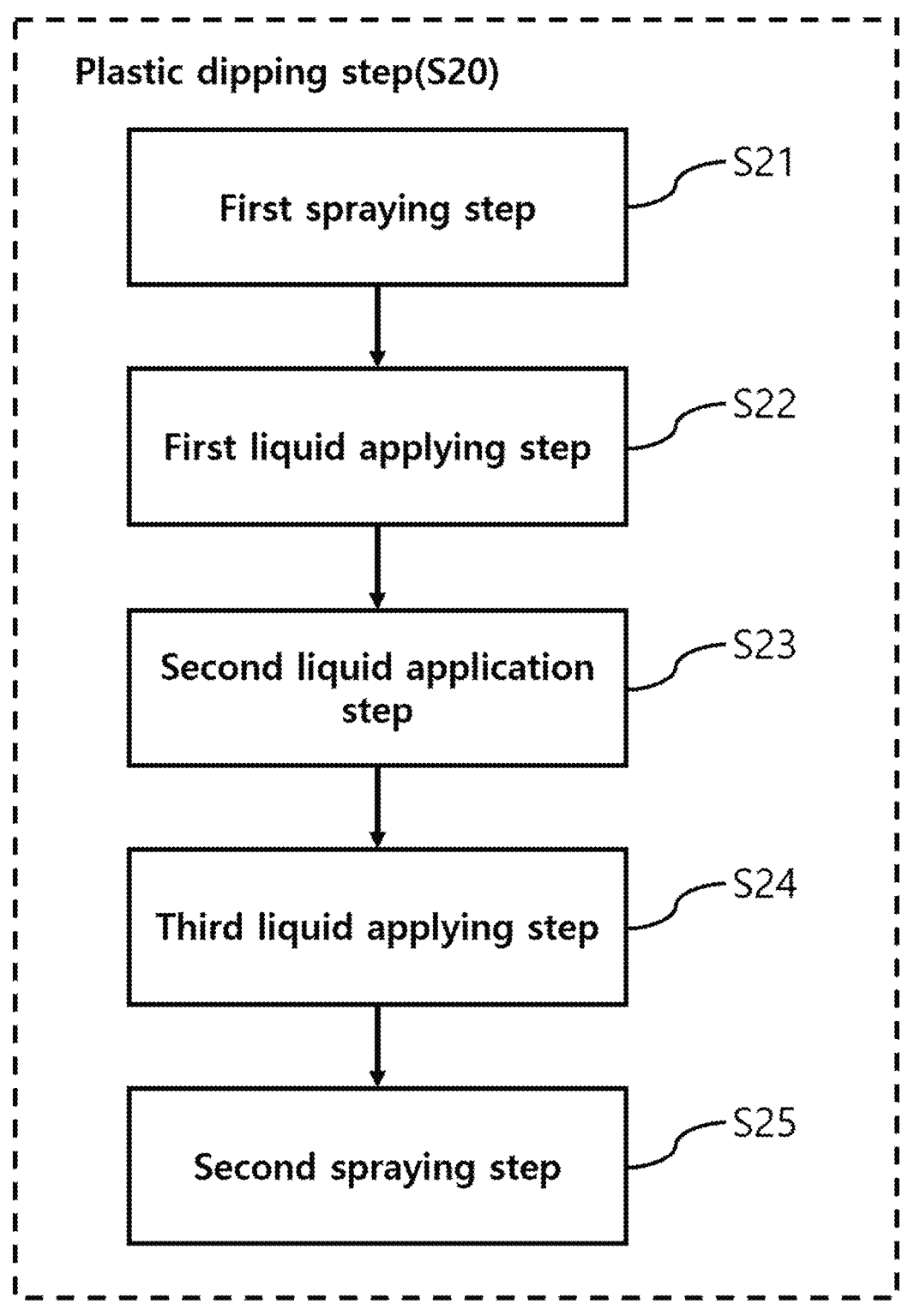
FIG. 5 is a block diagram sequentially illustrating a plastic dipping step of the manufacturing method of the bronchoscope simulator according to the present invention.
Figure 6:
FIG. 6 is a view illustrating a primary spray injection step of the manufacturing method of the bronchoscope simulator according to the present invention.
Figure 6:
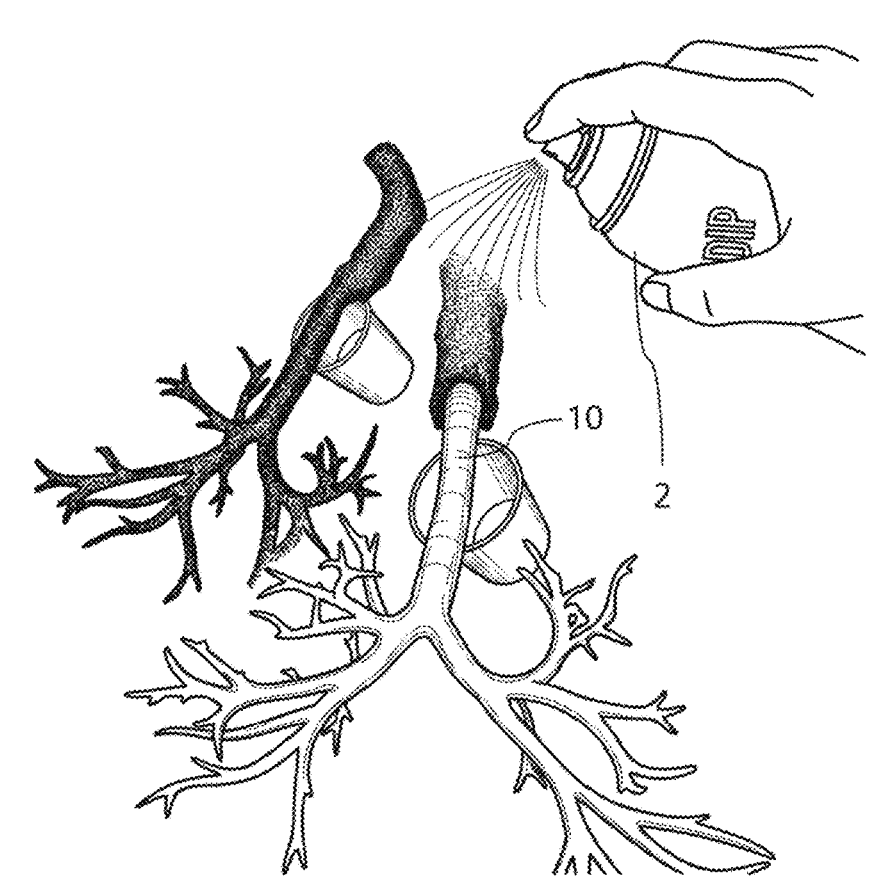
Figure 7:
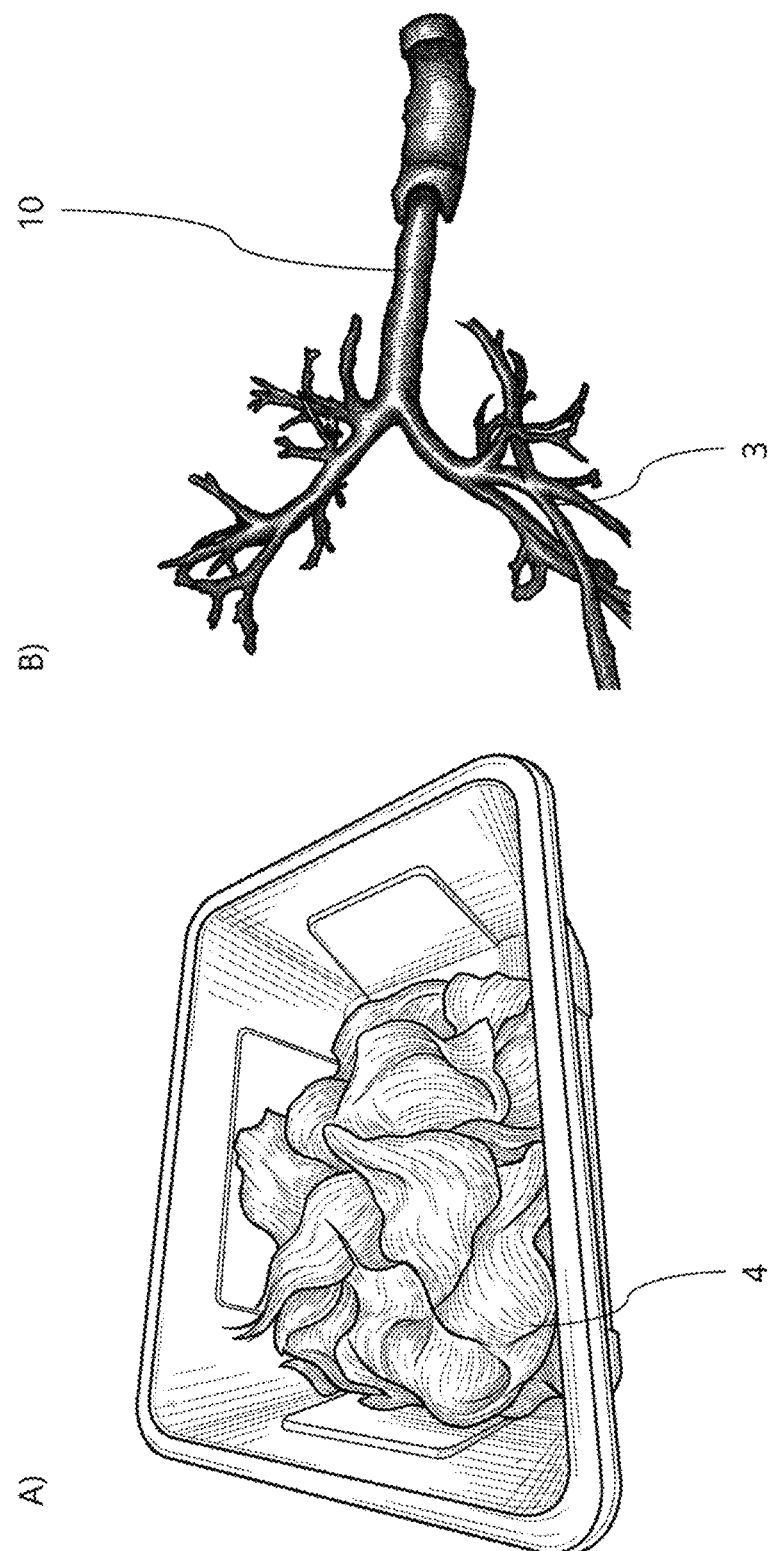
FIG. 7 is a view illustrating a secondary liquid coating step of the manufacturing method of the bronchoscope simulator according to the present invention.
Figure 8:
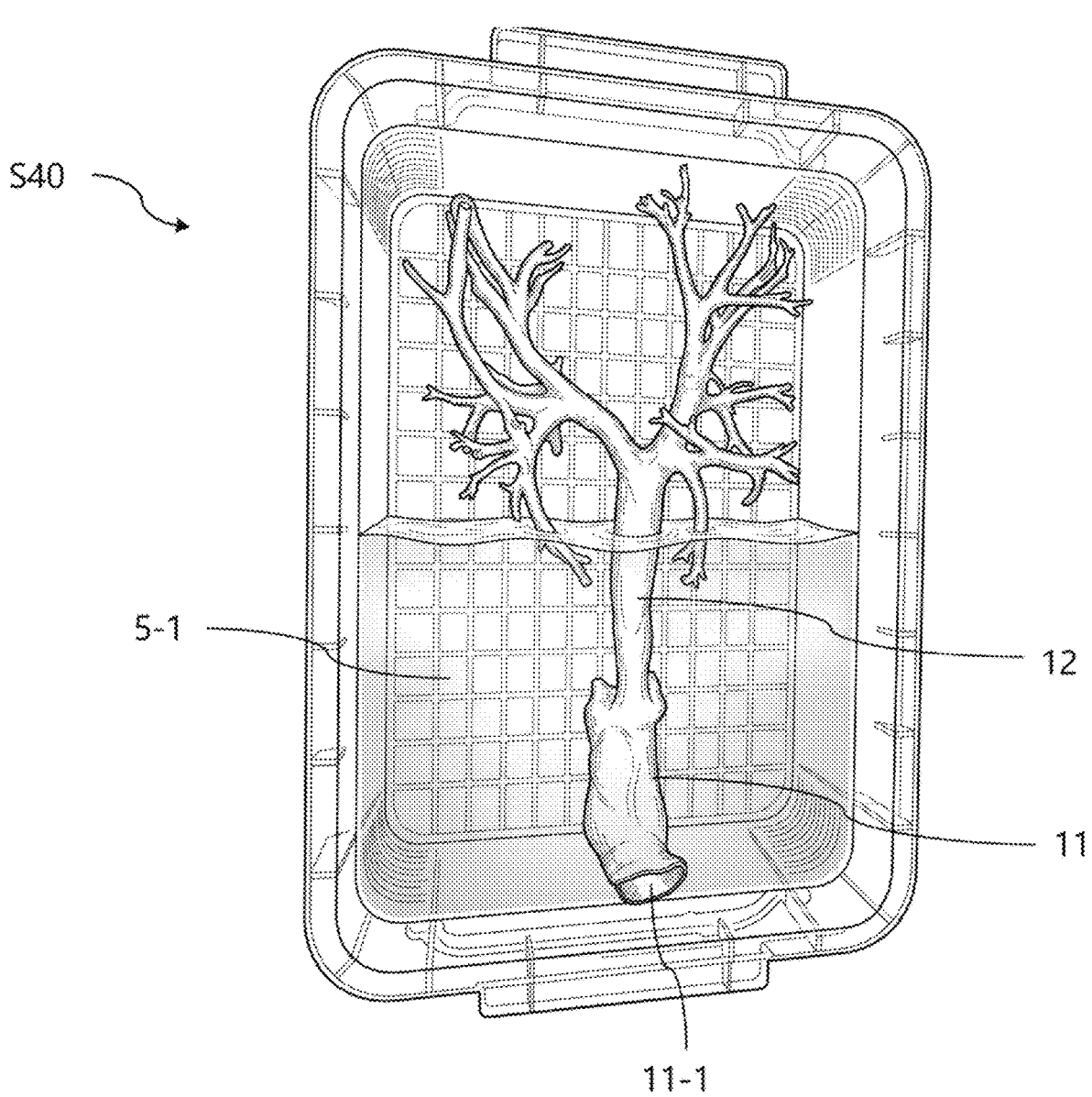
FIG. 8 is a view illustrating a liquid passing step of the manufacturing method of the bronchoscope simulator according to the present invention.
Figure 9:
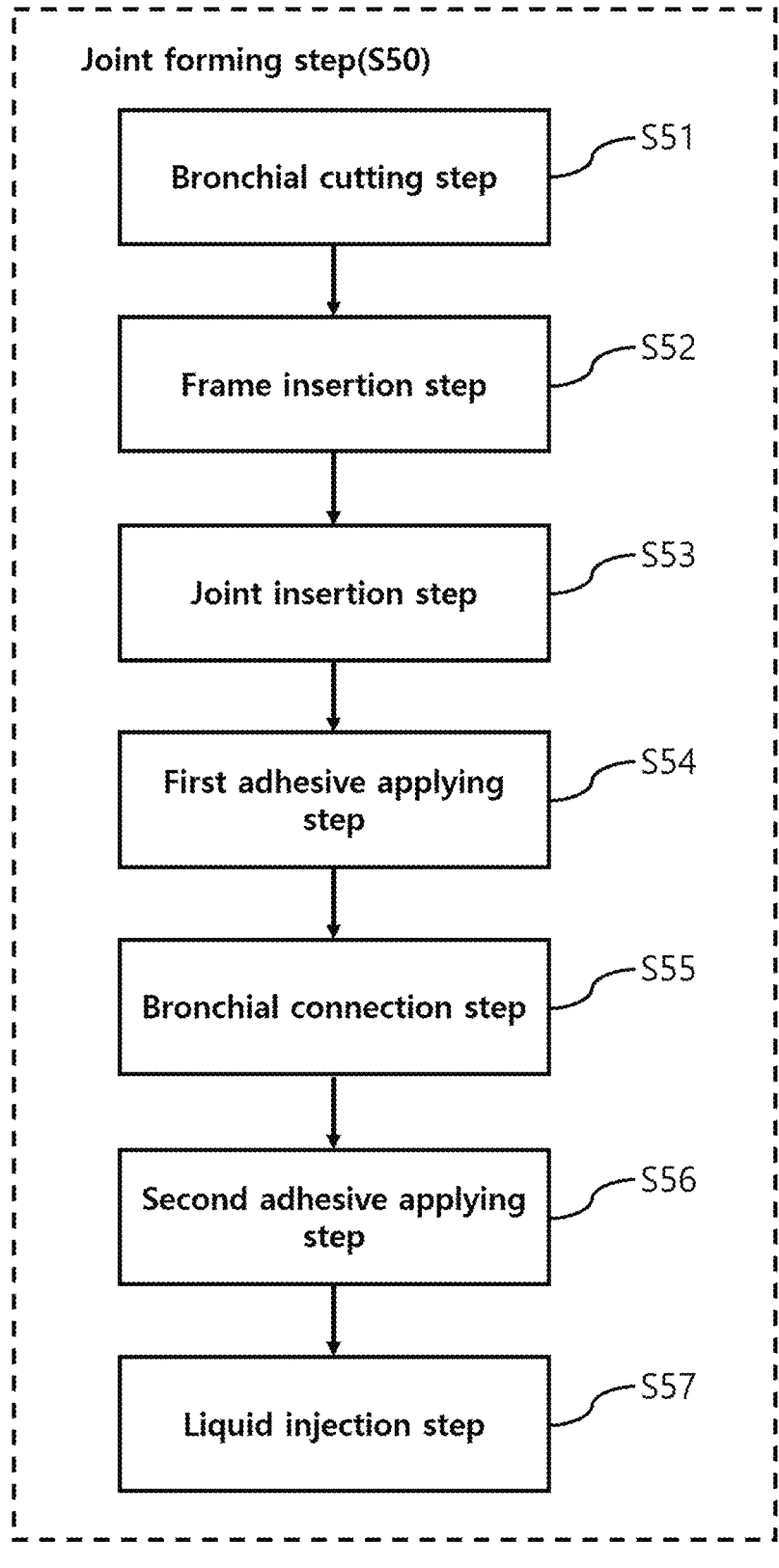
FIG. 9 is a drawing illustrating a joint manufacturing step of the manufacturing method of the bronchoscope simulator according to the present invention.
Figure 10:
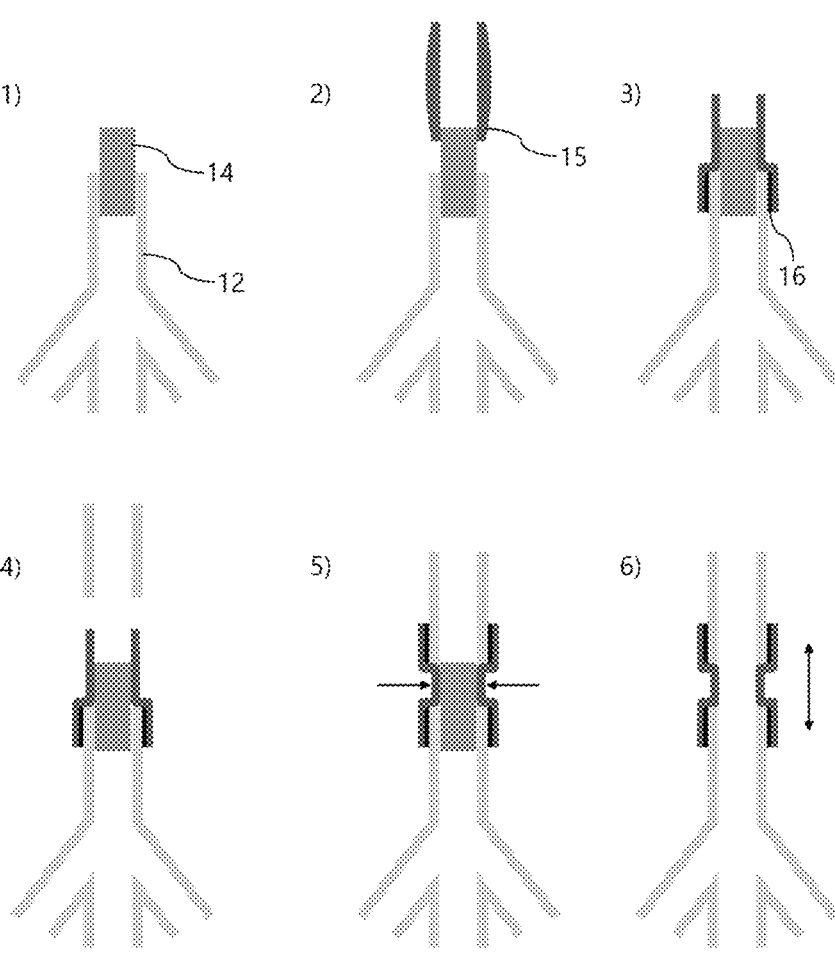
FIG. 10 is an exemplary view illustrating the joint manufacturing step of the manufacturing method of the bronchoscope simulator according to the present invention.

FIG. 1 is a block diagram illustrating a manufacturing method of a bronchoscope simulator according to the present invention, FIG. 2 is a block diagram sequentially illustrating a base part printing step of the manufacturing method of the bronchoscope simulator according to the present invention, FIG. 3 is a view illustrating a support part removal step of the manufacturing method of the bronchoscope simulator according to the present invention, FIG. 4 is a view illustrating a base part bonding step of the manufacturing method of the bronchoscope simulator according to the present invention, FIG. 5 is a block diagram sequentially illustrating a plastic dipping step of the manufacturing method of the bronchoscope simulator according to the present invention, FIG. 6 is a view illustrating a primary spray injection step of the manufacturing method of the bronchoscope simulator according to the present invention, FIG. 7 is a view illustrating a secondary liquid coating step of the manufacturing method of the bronchoscope simulator according to the present invention, FIG. 8 is a view illustrating a liquid passing step of the manufacturing method of the bronchoscope simulator according to the present invention, FIG. 9 is a drawing illustrating a joint manufacturing step of the manufacturing method of the bronchoscope simulator according to the present invention, and FIG. 10 is an exemplary view illustrating the joint manufacturing step of the manufacturing method of the bronchoscope simulator according to the present invention.

Hereinafter, the manufacturing method of the bronchoscopy simulator according to the present disclosure will be described in detail with reference to the attached drawings.

The manufacturing method of the bronchoscopy simulator according to the present disclosure includes printing a base part 10 by a 3D printer 1, and fabricating a bronchoscopy simulator in such a way that the base part 10 is melted away in a state in which the outside of the base part 10 is plastic dipped, thereby providing a user with a procedural experience similar to the reality compared to conventional endoscopy simulators.

Referring to FIG. 1, the manufacturing method of the bronchoscopy simulator according to the present disclosure includes: a base part printing step (S10) in which the base part 10 is printed by a 3D printer 1; a plastic dipping step (S20) in which plastic dipping is applied to the outside of the base part 10; a through-hole forming step (S30) in which a through-hole 11-1 is formed in the base part 10; a liquid passing step (S40) in which liquid 5-1 passes through the through-hole 11-1 to melt away only the base part 10 while leaving the plastic dipping intact; and a joint forming step (S50) in which a joint 15 is formed on one side of the base part 10.

First, in the base part printing step (S10), the base part 10 is printed by the 3D printer 1. More specifically, the 3D printer 1 is provided to create a three-dimensional object based on input drawings, like printing text or images. In this instance, three-dimensional data based on CT data of an actual patient can be inputted into the 3D printer 10. The 3D printer 1 uses a water-soluble material. In this instance, the water-soluble material may be, for example, polyvinyl alcohol (PVA). In other words, the base part 10 is printed by the 3D printer by using the PVA material, which has water-soluble properties.

In addition, the base part 10 includes an larynx part 11 and a bronchial part 12. The larynx part 11 is formed in a shape similar to the larynx part of the human body, and the bronchial part 12 is connected to the larynx part 11 and formed in a shape similar to the bronchi of the human body. In other words, the larynx part 11 and the bronchial part 12 are connected to form the base part 10. The larynx part 11 and the bronchial part 12 are each printed by the 3D printer 1.

Moreover, the base part printing step (S10) includes a support part removal step (S11) in which a support part 13 generated while the base part 10 is printed by the 3D printer 1 is removed. More specifically, referring to FIG. 3, the support part 13 is formed on one side of the bronchial part 12 while the bronchial part 12 is printed by the 3D printer 1. After the bronchial part 12 is printed by the 3D printer 1, in the base part printing step (S10), the support part 13 is removed from the bronchial part 1. At this time, the support part 13 can be removed by a cutting tool. For example, the cutting tool may be nippers, but any tool capable of removing the support part 13 can be used. Additionally, the support part 13 is, of course, formed from the same water-soluble material as the bronchial part 12. Of course, the support part 13 can also be formed on the larynx part 11, and a process of removing the support part 13 from the larynx part 11 can be included.

Moreover, the base part printing step (S10) further includes a base part bonding step (S12) in which the base part 10 is bonded. More specifically, referring to FIG. 4, the base part 10 includes the larynx part 11 and the bronchial part 12, and after the support part 13 is removed, the larynx part 11 and the bronchial part 12 are bonded to create the base part 10. At this time, the larynx part 11 and the bronchial part 12 can be bonded by a welding device. Additionally, the welding device can also be used to repair any breaks that occur while the base part 10 is printed by the 3D printer 1.

In the plastic dipping step (S20), plastic dipping is applied to the outside of the base part 10. More specifically, the base part 10 is formed from water-soluble polyvinyl alcohol (PVA) material, and the plastic dipping is applied to the outside of the base part 10. The plastic dipping refers to a portion where a dipping spray 2 and a dipping liquid 3 are sequentially layered on the outside of the base part 10. In other words, the plastic dipping can be formed by the dipping spray 2 and the dipping liquid 3.

Furthermore, the dipping liquid 3 can be sprayed by the dipping spray 2. The dipping liquid 3 can contain VM&P naphtha, hexane, toluene, ethyl methyl ketone, and carbon black. Additionally, the dipping spray 2 desirably has a specific gravity of 0.79 to 0.83, a boiling point of 65 to 141° C., a vapor pressure of 125 mmHg at 20° C., a flash point of 23° C., an explosive limit in air by volume of 0.9 to 11.5%, and volatility of 72 to 75%.

In summary, the dipping spray 2 and the dipping liquid 3 can be formed from air-drying synthetic rubber based on solvent.

More specifically, the plastic dipping step (S20) includes: a first spraying step (S21) in which the dipping spray 2 is firstly sprayed to the outside of the base part 10; a first liquid applying step (S22) in which the dipping liquid 3 is firstly applied to the outside of the base part 10; a second liquid application step (S23) in which the dipping liquid 3 is secondly applied to the outside of the base part 10 in a state in which a gauze 4 is attached to the outside of the base part 10; a third liquid applying step (S24) in which the dipping liquid 3 is thirdly applied to the outside of the base part 10; and a second spraying step (S25) in which the dipping spray 2 is secondly applied to the outside of the base part 10.

Firstly, referring to FIG. 6, in the first spraying step (S21), the dipping spray 2 is firstly sprayed to the outside of the base part 10. At this time, the dipping spray 2 can be an orange-colored spray to give a feel similar to the skin of the human body.

In the first liquid applying step (S22), the dipping liquid 3 is firstly applied to the outside of the base part 10. More specifically, the dipping liquid 3 is secondly applied to the outside of the base part 10 to make the plastic dipping thick. Of course, in the first liquid applying step (S22), the dipping liquid 3 is applied in such a manner that the base part 10 is dipped in the dipping liquid 3.

In the second liquid application step (S23), the dipping liquid 3 is secondly applied to the outside of the base part 10 in the state in which the gauze 4 is attached to the outside of the base part 10. More specifically, referring to FIG. 7(A), first, the gauze 4 is provided to prevent tearing of the plastic dipping and to increase the strength of the plastic dipping. Next, referring to FIG. 7(B), the dipping liquid 3 is secondly applied to the outside of the base part 10 in the state in which the gauze 4 is attached to the outside of the base part 10.

In the third liquid applying step (S24), the dipping liquid 3 is thirdly applied to the outside of the base part 10. More specifically, the dipping liquid 3 is thirdly applied to the outside of the base part 10 to prevent the gauze 4 from being separated from the plastic dipping.

In the second spraying step (S25), the dipping spray 2 is secondly applied to the outside of the base part 10. Of course, the dipping spray 2 can be sprayed in the same color as in the first spraying step (S21).

In addition, in the plastic dipping step (S20), the dipping spray 2 and the dipping liquid 3 are formed from a rubber material, thereby enhancing the elasticity and stretchability of the plastic dipping.

In the through-hole forming step (S30), a through-hole 11-1 is formed in the base part 10. More specifically, the through-hole 11-1 is formed on one side of the base part 10 to allow liquid to flow inside the base part 10, and preferably, can be formed at one end of the larynx part 11.

In the liquid passing step (S40), liquid 5 passes through the through-hole 11-1 to melt away only the base part 10 while leaving the plastic dipping intact. At this time, the liquid 5 can be liquid capable of melting the base part 10, for example, can be water 5-1. In other words, in the liquid passing step (S40), water 5-1 passes through the through-hole 11-1. Moreover, referring to FIG. 8, in the liquid passing step (S40), the base part 10 can be immersed in a container holding the water 5-1, such that the water 5-1 flows through the through-hole (110).

The joint forming step (S50) involves a process of forming a joint 15 at one side of the base part 10. That is, the joint 15 can be formed on the bronchial part 12 of the base part 10 to present the same movement as the real bronchi. In other words, the joint 15 is formed so that the bronchial part 12 can stretch or contract to or from one side to present the same movement as the real bronchi.

More specifically, the joint forming step (S50) includes: a bronchial cutting step (S51) in which some of the bronchial parts 12 are cut; a frame insertion step (S52) in which a frame 14 is inserted into the bronchial part 12; a joint insertion step (S53) in which the joint 15 is inserted outside the frame 14 and the bronchial part 12; a first adhesive applying step (S54) in which adhesive 16 is applied between the bronchial part 12 and the joint 15; a bronchial connection step (S55) in which the cut bronchial part 12 is connected to the joint 15; a second adhesive applying step (S56) in which the adhesive 16 is applied between the cut bronchial part 12 and the joint 15; and a liquid injection step (S57) in which the liquid 5 is injected into the bronchial part 12 so as to melt away only the frame 14 while leaving the bronchial part 12 and the joint 15 intact.

Firstly, the bronchial cutting step (S51) involves a process of cutting a portion of the plurality of bronchial parts 12. More specifically, the bronchial part 12 is formed in a cylindrical shape, and is cut at one side, and is separated from two bronchial parts 12.

Next, the frame insertion step (S52) is a process of inserting a frame 14 into the bronchial part More specifically, referring to FIG. 10(1), the frame 14 is formed in a cylindrical shape. The frame 14 is inserted into the bronchial part 12. In this instance, only half of the length of the frame 14 can be inserted into the bronchial part 12.

Next, the joint insertion step (S53) involves a process of inserting the joint 15 outside the frame 14 and the bronchial part 12. More specifically, referring to FIG. 10(2), the joint 15 is formed in a cylindrical shape. The joint 15 is made from an elastic material. For example, the joint 15 may be formed of latex rubber or thermoplastic elastomer (TPE). The joint 15 covers the frame 14 and the bronchial part 12.

In other words, the joint 15 covers both the exteriorly exposed frame 14 and the bronchial part 12 into which the frame 14 has been inserted.

Next, the first adhesive applying step (S54) involves a process of applying adhesive 16 between the bronchial part 12 and the joint 15. More specifically, referring to number FIG. 10(3), the adhesive 16 is applied between the outside of the bronchial part 12 into which the frame 14 has been inserted and the inside of the joint 15. In this instance, the adhesive 16 could be, for example, a cyanoacrylate-based adhesive.

Next, the bronchial connection step (S55) involves a process of connecting the cut bronchial part 12 to the joint 15. More specifically, referring to FIG. 10(4), the bronchial part 12 cut in the bronchial cutting step (S51) is connected to the joint 15. At this time, the bronchial part 12 can be connected inside the joint 15.

Next, the second adhesive applying step (S56) involves a process of applying adhesive 16 between the cut bronchial part 12 and the joint 15. More specifically, in the bronchial cutting step (S51), the adhesive 16 is applied between the cut bronchial part 12 and the joint 15.

Moreover, referring to FIG. 10(5), the second adhesive application step (S56) may include a joint compression step (S561), in which the joint 15 is pressurized to be in close contact with the outer surface of the frame 14. In the joint compression step (S561), the joint 15 is structured to maintain the shape of the joint even after the inserted frame 14 dissolves.

Lastly, the liquid injection step (S57) involves a process of injecting the liquid 5 into the bronchial part 12 so that only the frame 14 dissolves, while leaving the bronchial part 12 and the joint 15 intact. More specifically, referring to FIG. 10(6), the liquid 5 is injected into the bronchial part 12. The liquid 5 is liquid capable of dissolving the frame 14. For example, the liquid 5 can be water 5-1. Accordingly, the frame 14 disappears, and the two cut bronchial parts 12 can be connected to each other by the joint 15. Furthermore, since the joint 15 is made from an elastic material, the bronchial part 12 can expand or contract like the real bronchi.

In summary, the manufacturing method of the bronchoscope simulator according to the present invention manufacture a bronchoscope simulator by printing the base part 10 by a 3D printer 1 using PVA material, applying the plastic dipping to the outside of the base part 10, passing the water 5-1 through the through-hole 11-1 at one side of the base part 10 in a manner of melting away only the base part 10 while leaving the plastic dipping intact, and forming a joint on one side of the bronchial part 12.

Meanwhile, the endoscope simulator according to the present invention is designed to be inserted into the mouth and pass through the vocal cords to reach the interior of the bronchi to allow a user to observe the surroundings. In other words, the endoscope simulator according to the present invention can be used for bronchial purposes. Furthermore, through the joint 15, the endoscope simulator according to the present invention can realize movements similar to those of the actual bronchi.

Additionally, a wire (not shown) connected to a motor (not shown) can be connected to the bronchial part 12. Therefore, as the joint 15 stretches with the rotational power of the motor, the bronchial part 12 can express movements similar to those of the actual bronchi. Of course, multiple motors and wires can be provided, and the multiple wires can be connected to the multiple bronchial parts 12.

Therefore, the manufacturing method for the bronchoscope simulator according to this invention can be fabricated to be similar to the real bronchi, thereby providing the user with experiences similar to the reality in performing a bronchoscopy procedure.

In addition, the manufacturing method of the bronchoscopy simulator according to the present invention forms the bronchoscopy simulator of a material similar to the material of the real bronchi, thereby providing the user with a sufficient practice environment to promote safety of a patient.

It should be understood that the technical configuration of the present disclosure can be realized in other specific forms by those skilled in the art without changing the technical spirit or essential features of the present disclosure.

Therefore, the embodiments described above should be considered in all respects as illustrative and not restrictive. The scope of the present disclosure is defined by the appended claims, rather than the above description, and all changes or modifications derived from the meaning, scope and equivalents of the appended claims should be interpreted as falling within the scope of the present disclosure.

What is claimed is:

1. A manufacturing method of a bronchoscopy simulator comprising:

a base part printing step in which a base part is printed by a 3D printer using a soluble material;

a polymer coating step in which a polymer coating is applied to an outside of the base part;

a base part removing step in which the base part is brought into contact with a liquid capable of dissolving the soluble material to melt away only the base part while leaving the polymer coating intact; and a joint forming step in which a joint is formed on one side of the base part, wherein the polymer coating step includes:

a first spraying step in which a dipping spray is firstly sprayed to the outside of the base part;

a first liquid applying step in which a dipping liquid is firstly applied to the outside of the base part;

a second liquid application step in which the dipping liquid is secondly applied to the outside of the base part in a state in which a gauze is attached to the outside of the base part;

a third liquid applying step in which the dipping liquid is thirdly applied to the outside of the base part; and a second spraying step in which the dipping spray is secondly applied to the outside of the base part.

2. The manufacturing method according to claim 1, wherein the base part printing step includes:

a support part removal step in which a support part generated while the base part is printed by the 3D printer is removed.

3. The manufacturing method according to claim 1, wherein in the polymer coating step, the dipping spray and the dipping liquid are formed from a rubber material to enhance elasticity and stretchability of the polymer coating.

4. The manufacturing method according to claim 1, wherein the soluble material includes a water-soluble polyvinyl alcohol (PVA) material, and wherein the base part is immersed in water during the base part removing step.

* * * * *